United States Patent Office 3,207,803
Patented Sept. 21, 1965

3,207,803
DESORPTION OF MOLECULAR SIEVES BY HYDROGENATION
George D. Davis, El Dorado, Ark., assignor to Monsanto Company, a corporation of Delaware
No Drawing. Filed Dec. 27, 1960, Ser. No. 78,285
8 Claims. (Cl. 260—677)

The present invention relates to a process for the selective removal of straight-chain hydrocarbons from admixture thereof with branched and cyclic hydrocarbons. More particularly, the present invention relates to a process for the selective removal of unsaturated straight-chain hydrocarbons from admixture thereof with branched and cyclic hydrocarbons by contacting said mixture with a particular modified molecular sieve.

Molecular sieves, as referred to herein, are zeolites, both naturally occurring and synthetic. These zeolites have innumerable internal cavities with entrance pores of uniform size, and only those molecules having critical diameters less than the diameters of these entrance pores may enter the internal cavities. Conversely, those molecules having critical diameters larger than the pore diameter are excluded from the internal cavities. The entrance pores may vary in diameter from approximately 3 to 15 angstroms, but it is a characteristic of these zeolites that any particular zeolite will possess pores of substantially uniform size.

Zeolites vary somewhat in composition, but generally contain the elements silicon, aluminum, and oxygen as well as alkali and/or alkaline earth elements such as sodium and calcium. Zeolites which are particularly useful as molecular sieves are defined in U.S. Patent 2,920,038. Commercially available molecular sieves generally are synthetic sodium and calcium-alumino-silicate crystals. As synthesized, the crystals contain water of hydration which is driven out by heating. The removal of the water does not collapse or cause rearrangement of the crystal lattice with the result that a geometric network of empty cavities connected by channels are formed. Physically, molecular sieves are white powders with particles ranging in size from 1 to 5 microns in diameter. Each particle is a single crystal containing literally billions of tiny cavities or cages interconnected by channels of essentially uniform diameter. The particles may be bound together by a suitable porous binding material to form various size pellets.

The combined effect of the uniform pore diameter and strong surface forces which are characteristic of molecular sieves, essentially isolate compounds which have passed through the entrance pores into the internal cavities. Thus, molecular sieves have been suggested and utilized for a wide variety of separations. As applied to hydrocarbons these separations are between straight-chain and branched and/or cyclic hydrocarbons or between straight-chain hydrocarbons of varying degrees of unsaturation. Generally, those straight-chain compounds which are more polar in nature may be selectively adsorbed and held by molecular sieves.

It would seem from the separations potential of molecular sieves, that rapid commercialization of these materials in separations and purification processes would result. This has not been the case, however, primarily because of the difficulty of removing adsorbed molecules from the internal cavities. Elevated temperatures, alteration of pressure, purging or displacing gases and combinations of these are the conventional methods presently known in the art for the desorpiton and regeneration of the molecular sieves. However, use of these methods to remove unsaturated straight-chain compounds from the internal cavities of the molecular sieves has been substantially less successful. Molecular sieves possess a greater attractive force for unsaturated than for saturated compounds. Thus, the desorbing methods must of necessity be more severe if these hydrocarbons are to be desorbed, but, under these severe conditions necessary to cause desorption, considerable polymerization of the unsaturated hydrocarbons occurs. Overcoming the attractive force of molecular sieves for unsaturated straight-chain hydrocarbons and doing so with a minimum of polymerization of the hydrocarbons is, then, a major problem to be solved before molecular sieves can be successfully used in separations involving removal of unsaturated straight-chain hydrocarbons from admixture with branched and cyclic hydrocarbons.

It is an object of this invention to provide an improvement in the process of selectively adsorbing unsaturated straight-chain hydrocarbons from admixture thereof with other non-straight-chain hydrocarbons by means of molecular sieves. An additional object of this invention is to provide a new and novel procedure for the removal of adsorbed unsaturated straight-chain hydrocarbons from molecular sieves. A yet further object of this invention is to provide a more versatile adsorbent composition for the selective adsorption of unsaturated straight-chain hydrocarbons. A specific object of this invention is to provide a process wherein a hydrocarbon mixture comprising a n-olefin hydrocarbon in admixture with iso-olefin and/or cyclo-olefins and/or n-paraffin and/or iso-paraffin and/or naphthene and/or aromatic hydrocarbons is contacted with a modified molecular sieve in such manner that n-olefin hydrocarbons are selectively adsorbed on the modified molecular sieve and then selectively hydrogenated to the corresponding n-paraffin thereby facilitating desorption of the adsorbed n-olefin hydrocarbons. Additional objects will become apparent from the description of the invention herein disclosed.

In fulfillment of the objects of this invention, a method has been found whereby unsaturated straight-chain hydrocarbons may be separated from branched and cyclic hydrocarbons by means of molecular sieves without impariment of the efficiency of the molecular sieves due to inability to desorb those hydrocarbons adsorbed into the internal cavities of the molecular sieves. The method comprises contacting a hydrocarbon mixture comprising unsaturated straight-chain hydrocarbons and branched and/or cyclic hydrocarbons with a particularly modified molecular sieve and introducing a stream of hydrogen into contact with the modified molecular sieves either simultaneous with or following the contact of the hydrocarbon mixture with the particularly modified molecular sieves. The modified molecular sieves of this invention are prepared by immersion of an ordinary molecular sieve in a solution of a salt of a metal capable of causing catalytic hydrogenation and a suitable solvent therefor. After immersion for a period of time, the molecular sieve is filtered from the solution and dried. Hydrogen is then passed into contact with the treated molecular sieves at elevated temperatures for a period of time. The treatment of the molecular sieves with the metal salts does not alter the effective size of the internal cavities or the pore diameters. Thus, the selective adsorbing qualities of the molecular sieves remain the same as before the treatment. Therefore, on contacting the mixture with the modified molecular sieves, the unsaturated straight-chain hydrocarbons are selectively adsorbed and held in the internal cavities to the exclusion of the branched and cyclic hydrocarbons. In the presence of hydrogen, whether introduced simultaneously with the feed or following the feed, the adsorbed hydrocarbons are hydrogenated to more saturated hydrocarbons, thereby facilitating their removal from the molecular sieves. Upon hydrogenation of the adsorbed hydrocarbons, heat is produced by the exothermic hydrogenation reaction.

The heat thus produced makes less external heat necessary for desorption because of this direct application of heat to the adsorbing locale.

The following examples will serve to further explain and to illustrate the invention herein disclosed. It is to be understood, of course, that these examples are in no way to be construed as limiting the application, operation or conditions of this invention.

EXAMPLE I

A cylindrical chamber was packed with 660 grams (1000 cc.) of a modified molecular sieve containing therein 2.3 weight percent nickel. The modified molecular sieve was prepared by immersing a calcium-sodium-alumino-silicate having intercrystalline cavities with interconnecting channels and external pores of 5 angstroms diameter and marketed as Linde Type 5A molecular sieve in an approximately 5 percent by weight aqueous solution of $NiCl_2 \cdot 6H_2O$. The molecular sieves were in the form of $\frac{1}{16}$ inch diameter cylindrical pellets. They were allowed to remain in solution until the initial emerald green color of the solution changed to milky white. The pellets were filtered from the solution, water washed and dried. After drying, hydrogen was passed over the molecular sieves for several minutes at 350 to 450° C.

A $C_6$ hydrocarbon mixture of the composition given in the table below was passed into contact with the nickel containing molecular sieves at a flow rate of 2.1 liters per hour. The contacting or adsorption temperature was approximately 200° C. The effluent was periodically monitored to determine the equilibrium or complete loading of the modified molecular sieve. When equilibrium was reached, feed entry was stopped and a short nitrogen purge carried out. Upon completion of the purge, the temperature of the catalyst bed was increased to a temperature of 225° C. and hydrogen introduced into the catalyst chamber at a flow rate of 54 liters per hour with no preheat. The temperature was allowed to gradually increase from 225° C. to 350° C. The material collected prior to and including the nitrogen purge are given as sample A and the material collected during hydrogen entry is given as sample B.

*Analysis of feedstream and products*

| Component (Wt. Percent) | Feed | A | B |
|---|---|---|---|
| Below $C_6$ | 0.4 | 0.8 | 1.8 |
| 2-methylpentane | 2.2 | 2.3 | 0.4 |
| 3-methylpentane | 0.7 | 0.8 | 0.0 |
| n-Hexane | 0.0 | 0.0 | 66.2 |
| 4-methylpentene-1 | 4.4 | 6.9 | 0.0 |
| 4-methylpentene-2 | 28.6 | 40.4 | 0.8 |
| 2,3-dimethylbutene-1 | 0.4 | 2.3 | 0.0 |
| Hexene-1 | 1.5 | 0.8 | 1.8 |
| 2-methylpentene-1 trans-hexene-3 | 7.4 | 9.2 | 6.6 |
| Trans-hexene-2 cis-hexene-3 | 23.5 | 5.3 | 15.8 |
| 2-methylpentene-2 | 18.4 | 25.1 | 0.0 |
| Cis-hexene-2 | 8.1 | 0.0 | 6.6 |
| 2,3-dimethylbutene-2 | 4.4 | 6.1 | 0.0 |
| | 100.0 | 100.0 | 100.0 |
| Weight percent of charge | 100.0 | 64.0 | 29.2 |
| Weight percent of charge recovered | 93.2 | | |

The invention herein disclosed may have many specific applications. The applications include, at one extreme, utilizing the sieves primarily to facilitate regeneration of the molecular sieve bed in processes where the sieves are used to remove amounts of n-olefin hydrocarbon impurities from a predominantly iso-olefin, cyclic-olefin or possibly n-paraffin feedstream. A non-limiting illustrative example of such utility would be found in a situation wherein pure iso-olefin hydrocarbons are desired from a feedstream containing 98% iso-olefin and 2% n-olefin hydrocarbons. The n-olefin hydrocarbons could be selectively adsorbed on the molecular sieves. The modified molecular sieves could then be regenerated by passing hydrogen over the modified molecular sieve bed and thereby hydrogenating the n-olefin hydrocarbons to the corresponding n-paraffin hydrocarbons. The n-paraffin hydrocarbons thus produced are, to a large part, desorbed by and during the hydrogenation procedure. Those which are not so removed may be desorbed by any of the well known, conventional methods used for desorbing, n-paraffin hydrocarbons from molecular sieves. If it is desired to recover some n-olefins, then a mild desorption could be carried out then hydrogenation used to remove the last traces of n-olefins.

A considerably different application to that above is exemplified by a situation wherein it is desired to separate a feedstream comprised of a hydrocarbon mixture of approximately 40% hexene-1 and 60% 2-methylpentene-1 to produce an unsaturated hydrocarbon concentration of approximately 99% 2-methylpentene-1. The boiling points of the above compounds are for hexene-1, 63.5° C., and for 2-methylpentene-1, 62.1° C. It is obvious that considerable difficulty would be encountered in separating this mixture by distillation. Molecular sieves of the type known to the art would accomplish the separation. However, it would be virtually impossible to remove the hexene-1 adsorbed into the molecular sieves. In the practice of the present invention the mixture may be passed into contact with the modified molecular sieves simultaneously with a stream of hydrogen and under conditions of temperature and pressure which will favor both hydrogenation and adsorption thereby continuously producing a mixture of n-hexane and 2-methylpentene-1 which may be readily separated by conventional distillation techniques.

Example I has set forth as an order of procedure for one of the specific applications which may be practiced with the present invention, first, adsorption, second, a purge to remove any unadsorbed material from the external surfaces of the molecular sieve and, third, a combined hydrogenation-desorption period. Whether this procedure is followed or not will depend upon the specific utilization to be made of the present invention. The order of procedure may range from a process wherein adsorption is carried out first followed by a purge, then a mild desorption followed by hydrogenation of the non-desorbables, to a process wherein only one step is used by combining adsorption, desorption and hydrogenation. Between the 4-step procedure and the one-step procedure are many modifications which are dependent upon the circumstances of any specific application. These modifications will become readily apparent to those skilled in the art upon consideration of any of the many specific applications of the present invention and may be practiced without departing from the spirit and scope of the present invention.

The modified molecular sieves used in this invention are prepared by treating a synthetic or naturally occurring zeolite with a solution comprised of a salt of metal having the property of promoting hydrogenation and a suitable solvent therefor. To prepare the modified molecular sieve used in the present process, a salt of the desired hydrogenation-promoting metal is dissolved in a suitable solvent. The choice of both the metal salt and solvent is primarily a function of solubility. Water is a preferred solvent because of its availability, ease of handling, etc. Therefore, whenever possible it is preferable to use water soluble salts of the metals. When water soluble salts are not available, solvents other than water may be used. However, since the method whereby the hydrogenation causing metal is placed on the molecular sieve zeolite is an ion-exchange reaction, the metal salt and the solvent must be selected so that salts which may be formed by cations released from the molecular sieve in the ion-exchange and the free anions of the solution will remain in solution and not form a solid which would precipitate out in the internal cavities of the molecular sieves. The concentration of the metal salt in the solvent will be dependent upon the amount of the hydrogenation promoting metal desired in the molecular sieve. The chosen molecular sieve is totally immersed in the metal salt solution. It is, of course, necessary that there be thorough contact between the salt solution and the molecular sieves. To insure thorough contact it may be desirable in some instances to provide some form of mild agitation. The time necessary for the ion-exchange reaction to go to completion or to the desired stopping point will vary according to the metal ion being exchanged and its concentration in the solution. Standard methods of quantitative analysis may be used to determine when equilibrium or a desired concentration has been reached and in many cases color changes as exemplified in Example I or other such simple tests may indicate completion of the ion-exchange reaction to the desired concentration.

After completion of the treating period the molecular sieve is filtered from the solution and dried slowly for a period of time from a temperature of 110 to 120° C. to approximately 350° C. The exact method and temperatures for drying are not critical in the preparation of the novel selective hydrogenation catalyst herein disclosed. However, care must be taken not to damage in any way the crystalline structure of the molecular sieve during the drying procedure. Upon completion of the drying operation a stream of hydrogen is passed over the treated molecular sieve for several minutes at a temperature of about 300° C. to 500° C. The modified molecular sieve is then ready for use in the novel process of the present invention.

Many of the zeolites presently known in the art as molecular sieves may be used in the practice of this invention. However, those zeolites which are calcium and/or sodium-alumino-silicates having pore diameters of 3 to 15 angstroms are preferred. A more preferred zeolite is a calcium-sodium-alumino-silicate zeolite having pore diameter of 4 to 5 angstroms. The hydrogenation promoting metals with which the molecular sieves are treated are metals selected from those included in Group VIII of the periodic table. The metals which are preferred in the practice of this invention are nickel, cobalt, platinum and palladium.

The amount of hydrogenation catalyzing metal present in the modified molecular sieve may vary according to the metal chosen and the particular type of zeolite being treated. Generally, however, the amount of metal placed in the molecular sieve will range from 0.05 to 20 percent by weight of the total molecular sieve. A more preferred range of concentrations of the metal is from 0.5 to 10 percent by weight of the total molecular sieve. The optimum metal concentrations are dependent primarily upon the metal being used.

Hydrocarbon mixtures for which the invention herein disclosed has utility are mixtures comprising at least one unsaturated straight-chain hydrocarbon and one or more hydrocarbons chosen from the group comprised of unsaturated branched chain and cyclic hydrocarbons and/or saturated branched chain and cyclic hydrocarbons. The hydrocarbons may be mono or poly-olefinic, paraffinic, naphthenic or aromatic. The molecular weight of the hydrocarbon mixture may range from that of compounds containing only four carbon atoms up to those containing nine carbon atoms and higher. The molecular weight limitations of the feedstock are generally the same as those of other molecular sieve separation processes well known to those skilled in the art. However, due to the more efficient application of heat which results from the heat of hydrogenation produced within the internal cavity itself, hydrocarbons containing 2 to 3 more carbon atoms than those disclosed in the prior art may be effectively processed by the present invention.

The temperature and pressure at which the feedstock is contacted with the modified molecular sieves will vary as the molecular weight of the feedstream varies. Temperatures may range from 0 to 500° C. and pressures may range from atmospheric to 500 p.s.i.g. and higher. A somewhat more preferable range of temperatures are between 50 and 250° C. It is preferred to operate the present invention at atmospheric pressure to 250 p.s.i.g. Since the adsorption characteristics of the molecular sieves are not altered by placing the hydrogenation promoting metal in the molecular sieve and pressures for adsorption as set forth in the prior are relative to the molecular sieve utilized and the feed-stream treated may be applied in the practice of this invention. When adsorption, hydrogenation, and desorption are carried out in a single step, conditions of temperature and pressure which would normally be used for adsorption only will be satisfactory for the one-step procedure.

If, in the procedure used in the practice of this invention, it is found to be necessary to remove residual unadsorbed hydrocarbons from the presence of the molecular sieves after completion of the adsorption step, a purge gas may be used. The purge gas must be essentially chemically inert to the molecular sieves and also to the unsaturated hydrocarbons adsorbed therein. Examples of such gases are nitrogen, argon and helium.

When desorption and hydrogenation are carried out separately from adsorption, they are generally carried out concurrently. Generally, in a preferred embodiment of this invention hydrogen is used as a desorption gas and conditions as to temperature and pressure are controlled to be favorable to hydrogenation as well as desorption so that both desorption and hydrogenation take place simultaneously. However, specific utilities may arise in which it may be preferred to desorb the molecular sieve bed first and then hydrogenate the adsorbed materials which cannot be desorbed under reasonable conditions. The average molecular sieve bed temperature during the desorption-hydrogenation period using the present invention will be 50 to 100° C. lower than in the comparable period using the processes presently known to the art. This is primarily a result of a more efficient application of heat, the heat produced within the internal cavity of the modified molecular sieve by the exothermic hydrogenation reaction causing desorption. The pressures for the hydrogenation-desorption period are preferably at or near atmospheric pressure, though pressures as high as 500 p.s.i.g. and higher may be used. The optimum pressure and temperature for the desorption-hydrogenation period will, of course, be greatly dependent upon the specific utility to which the present invention is put.

The method whereby the hydrocarbon mixture to be separated is brought into contact with the novel molecular sieves of this invention may be by any method known to the art. The process may be one involving gas-solid or liquid-solid contact. The molecular sieve bed may be stationary or fluidized. If fluidized, the molecular sieve bed may be a dry powder or pellets or may be slurried in an appropriate inert liquid. The arrangement of the apparatus necessary for carrying out any of the various possible utilities of the modified molecular sieves of this invention will depend largely upon the specific utility and will follow arrangements well known to the art with possibly some modifications necessary for specific adaptation.

The amount of hydrogen is not critical to the present invention. Any amount of hydrogen ranging from minor amounts to a considerable excess may be used. It is desired, however, for optimum results to use an approximate stoichiometric amount of hydrogen for the amount of material to be hydrogenated. This is not to be limiting, however, since it may be desired to use excess hydrogen so that hydrogen may be used as a purge gas as well as for the hydrogenation. Many specific applications may be found wherein other than the stoichiometric amount of hydrogen may be utilized.

What is claimed is:
1. A process for the separation of mixtures consisting essentially of straight-chain unsaturated hydrocarbons and at least one hydrocarbon from the group consisting of branched-chain and cyclic hydrocarbons, said process con- sisting essentially of contacting said mixture with a molecular sieve having pore diameters of 4 to 5 angstroms, a portion of the ions of said molecular sieve having been replaced by ion-exchange with a metal selected from Group VIII of the periodic table, the amount of said metal being 0.05 to 20 percent by weight of said molecular sieve, said contacting being under conditions such that the unsaturated hydrocarbons are selectively adsorbed by said molecular sieve, ceasing contact of said mixture with said molecular sieve and thereafter passing a gas consisting essentially of hydrogen over said molecular sieve containing adsorbed unsaturated straight-chain hydrocarbons under temperature and pressure conditions sufficient to cause hydrogenation of adsorbed unsaturated straight-chain hydrocarbons, causing the adsorbed unsaturated straight-chain hydrocarbon to be hydrogenated, thereby facilitating desorption of said adsorbed straight-chain unsaturated hydrocarbons.

2. The process of claim 1 wherein the metal capable of promoting hydrogenation is nickel.

3. The process of claim 1 wherein the metal capable of promoting hydrogenation is cobalt.

4. The process of claim 1 wherein the metal capable of promoting hydrogenation is platinum.

5. The process of claim 1 wherein the metal capable of promoting hydrogenation is palladium.

6. The process of claim 1 wherein the contacting temperature is 0 to 500° C.

7. The process of claim 1 wherein the contacting temperature is 25 to 250° C.

8. The process of claim 1 wherein the amount of hydrogenation promoting metal containing in the molecular sieve is 0.5 to 10 percent by weight of the total molecular sieve.

References Cited by the Examiner

UNITED STATES PATENTS

| | | | |
|---|---|---|---|
| 2,859,173 | 11/58 | Hess et al. | 260—676 |
| 2,971,903 | 2/61 | Kimberlin et al. | 260—676 |
| 2,971,904 | 2/61 | Gladrow et al. | 260—676 |
| 2,976,331 | 3/61 | Kimberlin et al. | 260—676 |
| 3,075,023 | 1/63 | Garrison et al. | 260—676 |
| 3,140,322 | 7/64 | Frilette et al. | 260—667 |

OTHER REFERENCES

Emmett: Catalysis, 1955, vol. 3, Reinhold Pub. Co., pp. 98–100.

Weisz: "Journal of Physical Chemistry," March 29, 1960, vol. 64, No. 3, p. 382.

ALPHONSO D. SULLIVAN, *Primary Examiner.*